United States Patent [19]

Konishi et al.

[11] Patent Number: 5,440,077

[45] Date of Patent: Aug. 8, 1995

[54] COMBINED WEIGHTING AND DISPLACEMENT SENSOR AND WEIGHING APPARATUS USING THE SAME

[75] Inventors: Hiroyuki Konishi; Michito Utsunomiya; Kazufumi Naito, all of Shiga, Japan

[73] Assignee: Ishida Co., Ltd., Kyoto, Japan

[21] Appl. No.: 277,748

[22] Filed: Jul. 20, 1994

[30] Foreign Application Priority Data

Jul. 22, 1993 [JP] Japan .................. 5-202849

[51] Int. Cl.[6] ........................... G01G 3/14
[52] U.S. Cl. ................... 177/185; 177/229; 73/862.621
[58] Field of Search ........... 73/765, 772, 769, 778, 73/774, 862.621, 862.622, 862.628, 862.634; 177/211, 229, 185

[56] References Cited

U.S. PATENT DOCUMENTS

| | | | |
|---|---|---|---|
| 4,379,495 | 4/1983 | Cocks et al. | 177/185 |
| 4,589,291 | 5/1986 | Sander | |
| 4,657,097 | 4/1987 | Griffen | 73/862.628 |
| 5,117,929 | 6/1992 | Nakamura et al. | 177/185 |
| 5,154,247 | 10/1992 | Nishimura et al. | 177/229 |

FOREIGN PATENT DOCUMENTS

| | | |
|---|---|---|
| 0105564 | 4/1984 | European Pat. Off. . |
| 0122796 | 10/1984 | European Pat. Off. . |
| 0129249 | 12/1984 | European Pat. Off. . |
| 0147238 | 7/1985 | European Pat. Off. . |
| 0227597 | 7/1987 | European Pat. Off. . |
| 0289113 | 11/1988 | European Pat. Off. . |
| 0432979 | 6/1991 | European Pat. Off. . |
| 3233327 | 10/1991 | Japan ............... G01G 23/37 |

OTHER PUBLICATIONS

Communication from European Patent Office (Germany), Jan. 30, 1995, translated to English.

HBM Leaflet, "Dehmungsmesstreifen mit Zubehor", 10/86.
Extract Translation of "Dehmungsmesstreifen mit Zubehor", p. 29, first 2 paragraphs, Mar. 15, 1995.

Primary Examiner—Richard E. Chilcot, Jr.
Assistant Examiner—Max H. Noori
Attorney, Agent, or Firm—Sughrue, Mion, Zinn, Macpeak & Seas

[57] ABSTRACT

A combination of a weighing cell (C) with a displacement sensor (S) is disclosed, in which the weighing cell (C) includes a strain inducing element (1) having a strain generating region (55) at which strain is generated in response to application of a load thereto, and a strain gauge (56) for detecting the strain generated in the strain generating region (55), and the displacement sensor (S) includes a fixed rigid component (10), a movable rigid components (11) forming a weight element, a generally elongated beam member (20) rigidly secured at opposite ends to the fixed and movable rigid components (10, 11), respectively, so as to extend between the fixed and movable rigid components (10, 11), and a displacement detecting element (23) mounted on the elongated beam member (20) for outputting an electric signal of a magnitude proportional to the amount of displacement of the movable rigid component (11) in a direction generally perpendicular to the elongated beam member (20). The strain inducing element (1) of the weighing cell includes a fixed rigid body (52) adapted to be secured to a base (B) and a movable rigid body (57) adapted to receive the load to be measured, and first and second beams (54) rigidly secured at opposite ends to the fixed and movable rigid bodies (52, 57) and extending parallel to each other between the fixed and movable rigid bodies (52, 57). The displacement sensor (S) is fixedly carried by the fixed rigid body (52) of the weighing cell (C).

12 Claims, 9 Drawing Sheets

COMBINED WEIGHTING AND DISPLACEMENT SENSOR AND WEIGHING APPARATUS USING THE SAME

BACKGROUND OF THE INVENTION

1. Field of the Invention

The present invention relates to a weighing cell suited particularly for use in association with a weight checker and/or a combinational weighing apparatus, which cell is equipped with a displacement sensor designed to detect a vibratory component such as, for example, floor vibration, and also to a weighing apparatus utilizing such weighing cell equipped with the displacement sensor.

2. Description of the Prior Art

It is well known that a so-called floor vibration, that is, a low frequency vibration, harmful to a weighing cell (a load detector) is often generated at the site where there is installed a weighing apparatus such as, for example, a weight checker operable to detect the individual weight of articles being transported by means of a conveyor and/or a combinational weighing apparatus operable to measure a target weight by means of a combinational calculation of respective weights of articles detected by a plurality of weighing devices. This floor vibration causes the weighing cell to give rise to an erroneous weight measurement, and therefore, the error in weight measurement that is brought about by the floor vibration has to be compensated for in order to secure a correct result of weight measurement.

For this purpose, this type of weighing apparatus employs not only one or more weighing cells operable to provide a weight signal proportional to the weight of an article to be weighed, but also a displacement sensor mounted on the same base on which the weighing cell or cells are installed, so that an output signal outputted from the displacement sensor and subsequently inverted may be summed together with the weight signal to remove an undesirable signal component representative of a vibration of the base from the weight signal (See Japanese Laid-open Patent Publication No. 3-233327, published Oct. 17, 1991).

It has however been found that, since the position of the displacement sensor on the base and the position of the weighing cell on the same base are necessarily offset relative to each other, there is a problem in that an accurate detection by the displacement sensor of a vibration acting on the weighing cell through the base is not ensured.

SUMMARY OF THE INVENTION

The present invention has been devised with a view to substantially eliminating the above discussed problems and is intended to provide a combined weighing and displacement sensor of a type in which a weighing cell and a displacement sensor designed to detect a vibratory component such as, for example, floor vibration acting on the weighing cell are integrated together.

Another important object of the present invention is to provide an improved weighing apparatus of a type employing the combined weighing and displacement sensor of the type referred to above.

To this end, the present invention provides a combined weighing and displacement sensor in which the displacement sensor is incorporated in the weighing cell. The weighing cell includes a strain inducing element having a strain generating region at which strain is generated in response to application of a load thereto, and a strain gauge for detecting the strain generated in the strain generating region, and the displacement sensor includes a fixed rigid component, a movable rigid components forming a weight element, a generally elongated beam member rigidly secured at opposite ends to the fixed and movable rigid components, respectively, so as to extend between the fixed and movable rigid components, and a displacement detecting element mounted on the elongated beam member for outputting an electric signal of a magnitude proportional to the amount of displacement of the movable rigid component in a direction generally perpendicular to the elongated beam member. The strain inducing element of the weighing cell includes a fixed rigid body adapted to be secured to a base and a movable rigid body adapted to receive the load to be measured, and first and second beams rigidly secured at opposite ends to the fixed and movable rigid bodies and extending parallel to each other between the fixed and movable rigid components. The displacement sensor is fixedly carried by the fixed rigid body of the weighing cell.

In this construction according to the present invention, since the displacement sensor is fixedly supported by the base through the fixed rigid body of the weighing cell, both of the displacement sensor and the weighing cell are fixedly supported at the same position on the base and, therefore, no phase displacement occur between the displacement sensor and the weighing cell. Consequently, the vibration component contained in a weight signal outputted from the weighing cell can be accurately detected by the displacement sensor. Thus, by subtracting the detected vibration component from the weight signal outputted from the weighing cell, an accurate measurement of weight is accomplished conveniently.

According to one preferred embodiment of the present invention, the strain inducing element has a cavity defined therein and delimited by the fixed and movable rigid bodies and the first and second beams. The displacement sensor is accommodated within such cavity with the fixed rigid component thereof fixedly secured to the fixed rigid body of the weighing cell. Housing of the displacement sensor within the cavity in the weighing cell allows no portion of the displacement sensor to protrude outwardly from the perimeter of the weighing cell and, therefore, the combined weighing and displacement sensor as a whole can be assembled compact in size.

Alternatively, the displacement sensor may carried by the weighing cell with the fixed rigid component thereof secured to a side face of the fixed rigid body of the weighing cell, not within the cavity in the weighing cell.

Also preferably, the combined weighing and displacement sensor of the present invention may include a stopper means mounted on the strain inducing element of the weighing cell for suppressing an excessive displacement of the movable rigid component of the displacement sensor relative to the fixed rigid component thereof thereby to avoid a possible excessive deformation. The provision of this stopper means ensures an avoidance of any possible damage to the displacement sensor which would occur as a result of the possible excessive displacement of the movable rigid component of the displacement sensor relative to the fixed rigid component thereof.

According to a further preferred embodiment of the present invention, each of the fixed and movable rigid components of the displacement sensor is in the form of a block and the elongated beam member of the displacement sensor comprises first and second beam elements extending parallel to each other between the fixed and movable rigid components. Each of the first and second beam elements has at least one region of easy flexure defined therein forming the strain generating region and being in the form of a thin plate made of metal. The displacement detecting element is mounted on at least one of said first and second beam elements in alignment with the corresponding region of easy flexure.

According to the above described construction, since the first and second beams extend parallel to each other between the fixed and movable rigid components, there is no possibility of the first and second beams being twisted. Also, since each of the fixed and movable rigid components is made in the form of a block and since each of the first and second beams is formed of a thin plate of metal, a required weight can be secured in the movable rigid component and each of the first and second beams may have a reduced thickness without considering the required weight. Accordingly, the region of easy flexure in the first and second beams is susceptible to deformation in response to even weak vibration and, therefore, the displacement sensor can ba made compact in size. As a result thereof, the displacement sensor can be fixed to the fixed rigid body of a weighing cell without adversely affecting the characteristics of the weighing cell.

If the opposite ends of each of the first and second beams are connected to the fixed and movable rigid components by the use of a welding technique, no fixture such as set screws is required and, also, a small weld joint is sufficient to connect each end of each beam to the fixed or movable rigid component. Accordingly, the size of the displacement sensor can further be reduced.

In a still further preferred embodiment of the present invention, the displacement sensor is also provided with means for regulating the stroke of displacement of the movable rigid block relative to the fixed rigid block thereby to suppress an excessive displacement of the movable rigid block relative to the fixed rigid block. This regulating means comprises a generally elongated stopper element rigidly secured to one of the fixed and movable rigid block so as to extend in a direction towards the other of the fixed and movable rigid blocks and positioned generally intermediate between the first and second beams, and a groove means provided in the other of the fixed and movable rigid blocks for defining a groove for receiving the stopper element.

The provision of the regulating means is effective to avoid any possible damage to the displacement sensor which would occur when the movable rigid component of the displacement sensor is excessively loaded.

According to a yet further preferred embodiment of the present invention, there is provided a weighing apparatus having the above-mentioned combined weighing and displacement sensor, and a weighing table coupled with the movable rigid body of the weighing cell.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

Figure 1:
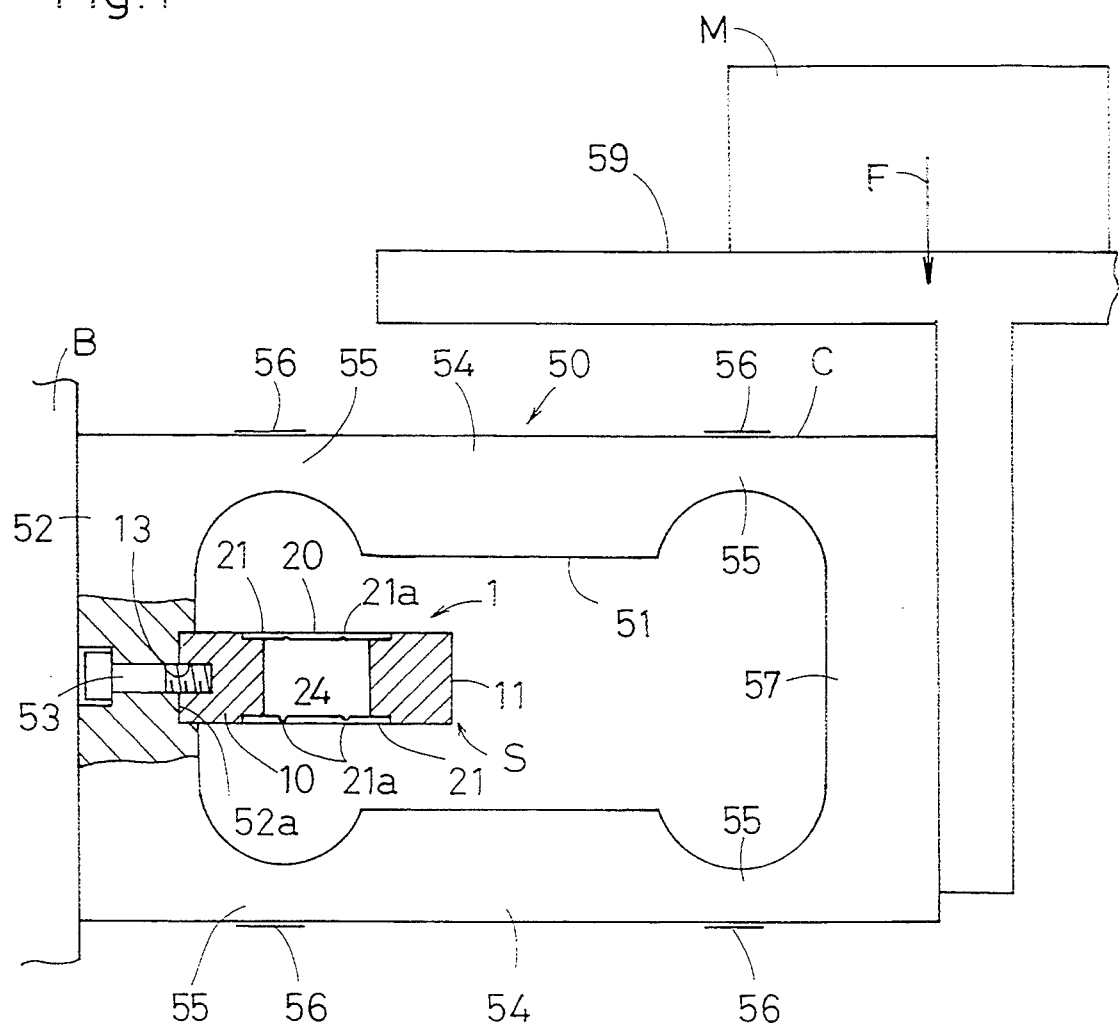
FIG. 1 is a schematic front elevational view, with a portion shown in section, of a combined weighing and displacement sensor according to a first preferred embodiment of the present invention.
Figure 2:
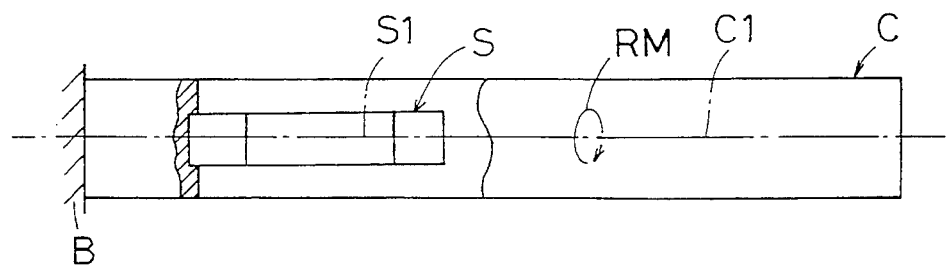
FIG. 2 is a plan view showing the combined weighing and displacement sensor according to the first preferred embodiment of the present invention.

Referring first to FIGS. 1 and 2 which illustrate a first preferred embodiment of the present invention, a first strain inducing element 50 shown therein forms a weighing cell C and is comprised of a load cell of a type well known to those skilled in the art. This first strain inducing element 50 is of a generally rectangular configuration including a fixed rigid body 52 and a movable rigid body 57, substantially occupying respective ends of the first strain inducing element 50, and parallel upper and lower beams 54 connecting the fixed and movable rigid bodies 52 and 57 together and spaced a distance from each other while defining the cavity 51. A portion of the fixed rigid body 52 confronting the cavity 51 has a support recess 52a defined therein, and a secondstrain inducing element 1 forming a displacement sensor S is accommodated within a cavity 51 defined in the first strain inducing element 50 forming the weighing cell C. The second strain inducing element 1 is in turn supported by the fixed rigid body 52 with one end thereof received in the support recess 52a and connected therewith through a set bolt 53 so as to have its longitudinal sense lying substantially parallel to the longitudinal sense of the first strain inducing element 50.

The first strain inducing element 50 is supported with the fixed rigid body 52 rigidly secured to any suitable mount B such as, for example, a framework installed on a floor. The movable rigid body 57 of the first strain inducing element 50 is coupled with a weighing table 59 on which an article M to be weighed is placed. Each of the upper and lower beams 54 has a pair of regions of easy flexure or strain generating regions 55, and four strain gauges 56 are fixedly mounted on respective portions of outer surfaces of the upper and lower beams 54, which are aligned with the associated regions of easy flexure 55, so that a load F imposed by the article M to be weighed on the movable rigid body 57 can be detected.

The weighing cell C incorporating the displacement sensor S is suitably utilized where vibrations occurring at the site of installation of the weight checker and/or the combinational weighing apparatus are apt to reduce the accuracy of weight measurement. The displacement sensor S and the weighing cell C are so positioned as to have their longitudinal center axes S1 and C1 lying in the same vertical plane as shown in FIG. 2. Accordingly, an equal amount of rolling moment acting about a horizontal axis acts on both of the displacement sensor S and the weighing cell C and, therefore, an undesirable influence brought about by the rolling moment RM on the displacement sensor S and that on the weighing cell C are advantageously counterbalanced to each other, thereby enabling the displacement sensor S to accurately detect a displacement, that is, a vibration, acting on the weighing cell C in the vertical direction.

According to the first preferred embodiment of the present invention, maximized utilization of space is possible if the displacement sensor S is accommodated within the cavity S1 of the first strain inducing element 50 forming the weighing cell C such as realized according to the first preferred embodiment of the present invention shown in and described with reference to FIGS. 1 and 2 and, therefore, the weighing apparatus as a whole can have a reduced size. Also, since the displacement sensor S and the weighing cell C are fixedly supported on the mount B, that is, at the same site on the floor, the same phase of vibration (floor vibration) acts on the displacement sensor S and the weighing cell C and, consequently, the vibration component contained in the weight signal W can be accurately removed on the basis of the displacement signal D outputted from the displacement sensor S, making it possible to accomplish a precise and accurate weight measurement.

Where the first strain inducing element 50, that is, the weighing cell C, has the cavity 51 of a relatively great volume, the displacement sensor S to be accommodated within the cavity 51 may have an increased size. This makes it possible to employ comparably large displacement sensors having the second strain inducing element of a shape similar to those of the illustrated first strain inducing element 50 forming the weighing cell C. Also, a displacement sensor of a type wherein a single plate-like beam is employed between the fixed and movable rigid bodies and a strain gauge is mounted on such single plate-like beam may be concurrently employed.

Figure 3:
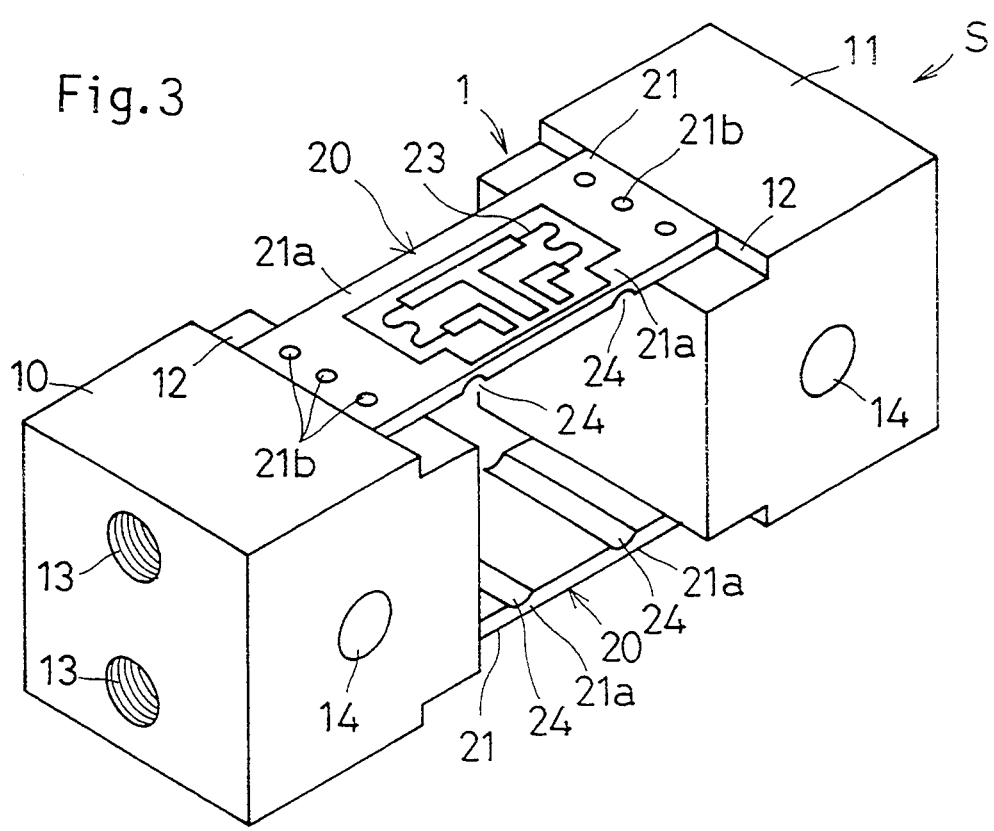
FIG. 3 is a schematic perspective view showing the sensor employed in the first embodiment of the present invention.

The details of the displacement sensor S referred to above are shown in FIG. 3. Referring to FIG. 3, the second strain inducing element 1, that is, the displacement sensor S, shown therein comprises a fixed cube or block 10, a movable cube or block 11 and generally rectangular upper and lower thin plates 21 forming respective upper and lower beams and extending parallel to each other between the fixed and movable cubes 10 and 11. The upper and lower beams 20 extend parallel to each other and in a direction perpendicular to the direction in which vibration acts. Each of the upper and lower rectangular thin plates 21 forming the respective upper and lower beams 20 has regions of easy flexure or strain generating regions 21a formed therein at respective locations adjacent the movable and fixed cubes 10 and 11 so as to extend in a direction perpendicular to the longitudinal axis of the rectangular thin plates 21. These regions of easy flexure 21a in each of the upper and lower thin plates 21 are regions about which the respective rectangular thin plate 20 is most susceptible to flex. Accordingly, when a machine component part to which the fixed cube 10 is rigidly secured undergo a vibratory motion in a direction generally normal to a principal plane of any one of the upper and lower thin plates 21, that is, the upper and lower beams 20, the strain inducing element 1 undergoes a cyclic parallel motion in which the movable cube 11 displaces cyclically relative to the fixed cube 10 in a direction conforming to the direction in which the vibratory motion takes place.

Each of the fixed and movable cubes 10 and 11 is in the form of a generally cubic block made of metal such as, for example, stainless steel and has a pair of generally L-sectioned recesses formed therein so as to leave positioning shoulders generally identified by 12. The upper and lower thin plates 21 are so positioned as to straddle the fixed and movable cubes 10 and 11 with their opposite ends held in abutment with the associated positioning shoulders 12 while extending parallel to each other, thereby securing the position of each of the upper and lower thin plates 21 relative to the fixed and movable cubes 10 and 11 in the longitudinal direction of the sensor. The opposite ends of the upper and lower thin plates 21 are, after having been positioned in the manner described above, spot-welded at 21b to the fixed and movable cubes 10 and 11 by the use of any known spot-welding technique, for example, a YAG laser welding technique.

When in use, the strain inducing element 1 is mounted in a machine or a vehicle with the fixed cube 10 rigidly secured to the machine component part and, for this purpose, the fixed cube 10 is formed with a plurality of internally threaded bolt receiving holes 13. It is to be noted that each of the fixed and movable cubes 10 and 11 may have a bolt insertion hole 14 formed therein for the convenience of assemblage.

As indicated above, the upper and lower thin plates 21 form the respective upper and lower beams 20 extending between the fixed and movable cubes 10 and 11 with their opposite ends spot-welded thereto. Each of these upper and lower plates 21 is in the form of a rectangular stainless steel plate having a thickness of about 0.3 min. This thickness of the stainless steel plate for each of the upper and lower thin plates 21 is preferred to be not greater than 1.0 mm and is more preferably not greater than 0.5 mm.

Figure 4:
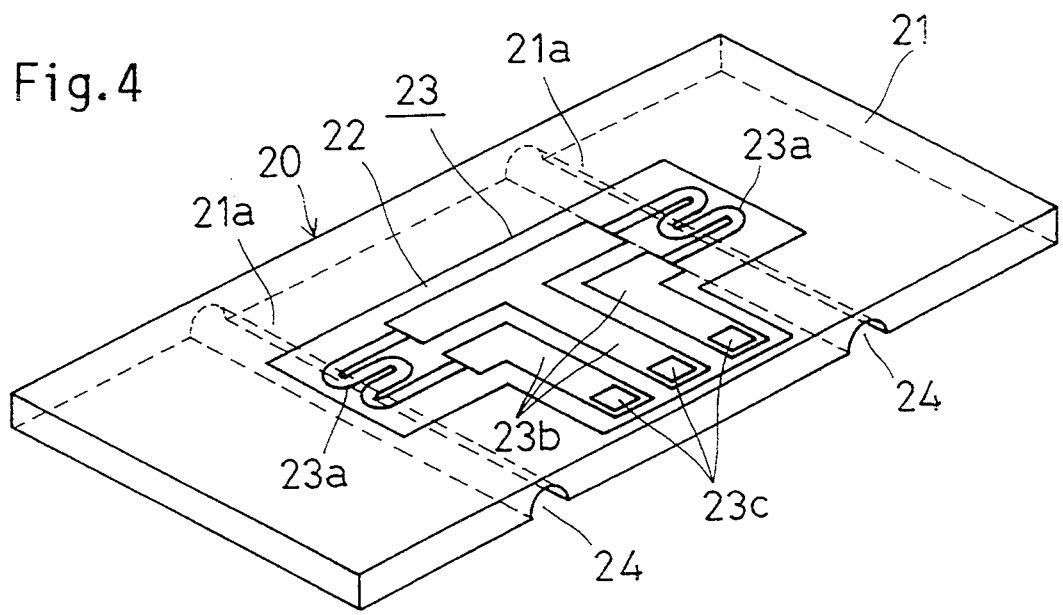
FIG. 4 is a schematic perspective view, on an enlarged scale, of one of thin plates forming respective beams of the strain inducing element shown in FIG. 3.

At least one of the rectangular upper and lower thin plates 21, and in this embodiment, each of the upper and lower thin plate 21, has a strain gauge 23 formed directly on one surface thereof. This strain gauge 23 is an example of a displacement detecting element which provides an electric signal of a magnitude proportional to the amount of displacement of the movable rigid cube 11 in the vertical direction. More specifically, as best shown in FIG. 4, the strain gauge 23 is formed on one surface of the rectangular upper thin plate 21 through an electrically insulating layer 22. These regions of easy flexure 21a referred to above and formed in each of the rectangular upper and lower thin plates 21 are defined by corresponding transverse grooves 24 formed on the surface of the respective thin plate 21 opposite to the surface thereof on which the strain gauge 23 is formed. It is to be noted that, although in the foregoing embodiment the strain gauges 23 are formed on the two thin plates, that is, the upper and lower thin plates 21, the strain gauge 23 on one of the upper and lower thin plates may be dispensed with.

The strain gauge 23 on the rectangular thin plate 21 includes, as best shown in FIG. 4, strain sensing elements 23a in the form of resistance wires disposed so as to traverse the respective regions of easy flexure 21a, that is, the respective grooves 24, first to third conductors 23b and terminal elements 23c connected electrically with the first to third conductors 23b. The first or center conductor 23b connects the strain sensing elements 23a together while the second and third conductors 23b are connected with respective ends of the strain sensing elements 23a. This strain gauge 23 is so designed and so operable that, when tensile stress and compressive stress are built up on respective surface regions of the rectangular upper thin plate 21 corresponding to the regions of easy flexure 21a as a result of deformation of the strain inducing element 1 shown in FIG. 3, the electric resistances of the strain sensing elements 23a best shown in FIG. 4 increases and decreases, respectively, in proportion to the magnitudes of the tensile and compressive stresses so built up. Respective changes in resistance of the strain sensing elements 23a are outputted from the terminal elements 23c to an external processing unit through a cable (not shown) so that the external processing unit can provide an indication of the magnitude of displacement brought about by the vibration component that has acted on the strain inducing element 1.

A method of manufacturing the strain gauge 23 of the type referred to above will now be described.

Figure 5:
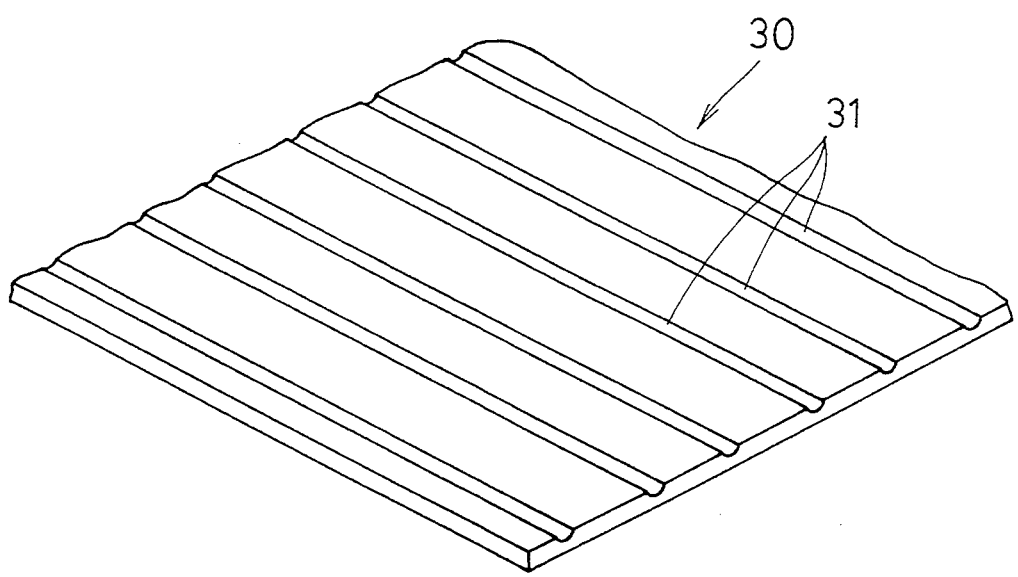
FIG. 5 is a schematic fragmentary perspective view of a plate material having parallel grooves formed therein, said plate material being used to provide the thin plates utilized in the strain inducing element.

At the outset, as shown in FIG. 5, a relatively large thin plate material 30 made of metal such as, for example, stainless steel is prepared and a plurality of grooves 31 are formed on one surface of the thin plate material 30 so as to extend parallel to each other while being spaced an equal distance from each other. These grooves 31 are, in the practice of the present invention, formed in the following manner by the use of a half-etching technique.

Figure 6:
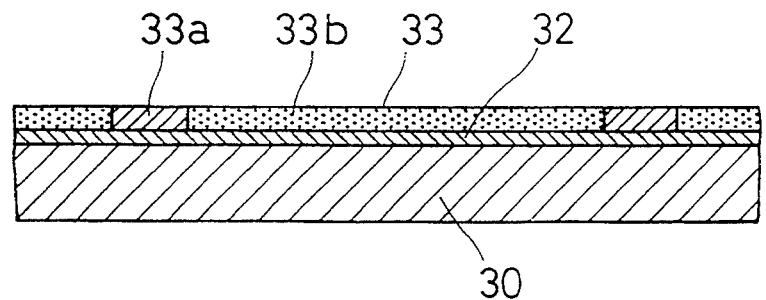
FIG. 6 is a schematic side sectional view, on a further enlarged scale, showing a first step of the process of forming the grooves in the plate material by the use of an etching technique.
Figure 7:
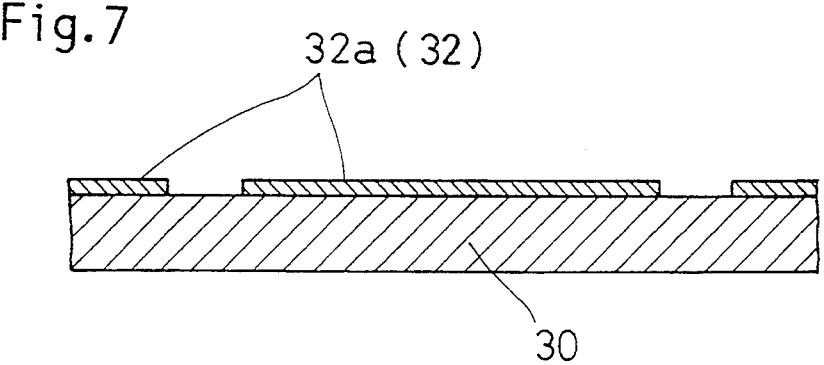
FIG. 7 is a view similar to FIG. 4, showing a second step of the groove forming process.

As shown in FIG. 6, a resist layer 32 is formed on one surface of the thin plate material 30, and a masking film 33 having a pattern of light shielding areas 33a and light transmitting areas 33b is then placed over the resist layer 32. Then, rays of light from a light source positioned above the thin plate material 30 are projected onto the thin plate material 30 to allow portions of the resist layer 32 aligned with the light transmitting areas 33b of the masking film 33 to be cured. After those portions of the resist layer 32 aligned with the light transmitting areas 33b of the masking film 33 have been cured, and after the making film 33 has subsequently been removed, those portions of the resist layers 32 which have not been exposed to the rays of light, that is, which are aligned with the light shielding areas 33a of the masking film 33 and are hence non-cured, are removed off in contact with a developer, thereby leaving only the cured portions 32a of the resist layer 32 on the surface of the thin plate material 30 as shown in FIG. 7.

Figure 8:
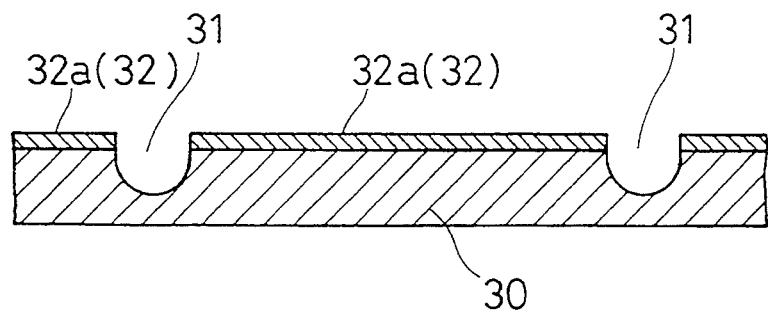
FIG. 8 is a view similar to FIG. 4, showing a third step of the groove forming process.

Thereafter, as shown in FIG. 8, portions of the thin plate material 30 which are not covered by the cured portions 32a of the resist layer 32 are etched off in contact with an etching solution to a desired or required depth, followed by removal of the cured portions 32a of the resist layer 32. In this way, the thin plate material 30 having the grooves 31 formed thereon as shown in FIG. 5 is obtained.

Figure 9:
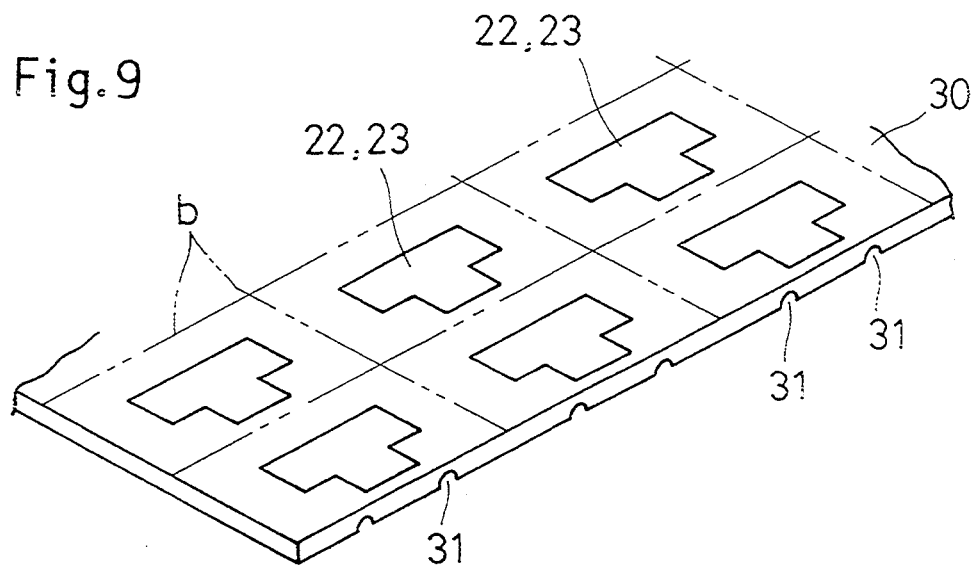
FIG. 9 is a schematic fragmentary perspective view of the plate material in which a number of strain gauges are formed.
Figure 10:
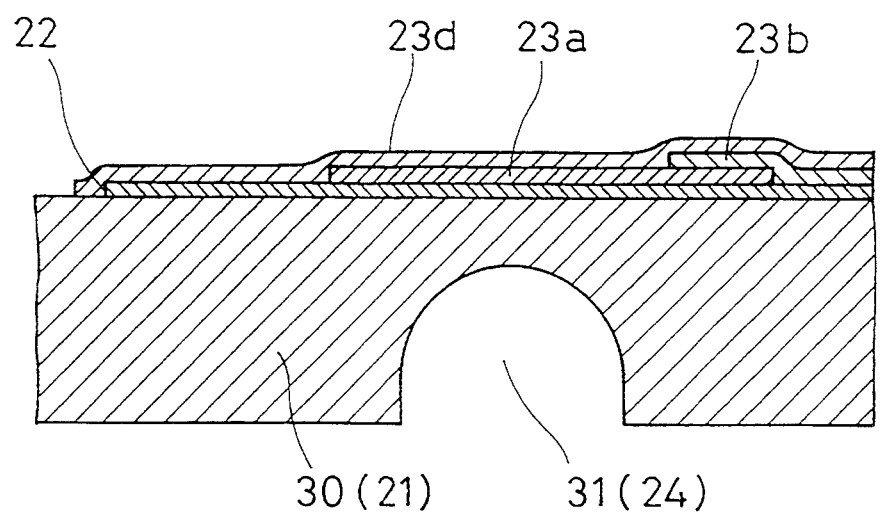
FIG. 10 is an exaggerated side sectional view of a portion of the plate material, showing the details of one strain gauge.

Using the thin plate material 30 having the grooves 31 formed thereon is formed in the manner described above, an electrically insulating layer 22 shown in FIG. 9 is formed on the surface of the thin plate material 30 opposite to the surface thereof where the grooves 31 are formed, and a plurality of strain gauges 23 are then deposited in a matrix pattern over the electrically insulating layer 22. As a matter of practice, these strain gauges 23 are formed by repeatedly exercising formation of a metal thin film by the use of a sputtering technique and etching of the metal thin film to form a predetermined pattern. By so doing, each strain gauge 23 so obtained is of a structure in which, as best shown in FIG. 10, at least strain sensing elements 23a and conductors 23b are laminated and are in turn covered by a protective layer 23d formed by the use of a screen printing process.

The thin plate material 30 having a matrix pattern of the strain gauges 23 and the parallel grooves 31 formed on the respective opposite surfaces thereof is scribed, or otherwise cut, along grid lines, shown by the phantom lines b in FIG. 9, into a plurality of pieces, one piece corresponding to the individual rectangular thin plate 21 shown in FIG. 4 having the strain gauge 23 and the grooves 24 formed on the respective opposite surface thereof. In this way, the thin plate material 30 having the strain gauges 23 and the parallel grooves 31 provides a plurality of the individual rectangular thin plates 21 having the strain gauges 23 and the grooves 24.

Figure 11:
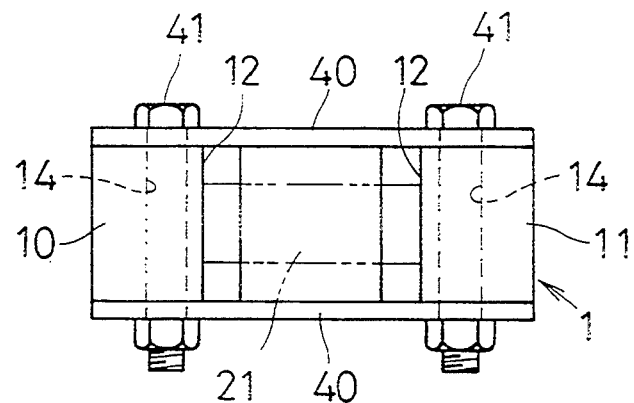
FIG. 11 is a schematic plan view showing a welding step effected to the thin plate.

The individual rectangular upper thin plate 21 having the strain gauge 23 and the grooves 24 is mounted on the fixed and movable cubes 10 and 11 shown in FIG. 3 in the manner which will now be described with particular reference to FIG. 11 showing a plan view of the sensor.

As shown in FIG. 11, the fixed and movable cubes 10 and 11 are sandwiched between side jig plates 40 with the positioning shoulders 12 in one of the fixed and movable cubes 10 and 11 confronting with the associated positioning shoulders 12 in the other of the fixed and movable cubes 10 and 11 and are tightly clamped therebetween by means of fastening bolts 41 passing through the bolt insertion holes 14 defined respectively in the fixed and movable cubes 10 and 11. In this way, the fixed and movable cubes 10 and 11 are fixed in position relative to each other. While the fixed and movable cubes 10 and 11 are so positioned relative to each other, the rectangular upper thin plate 21 is, as shown by the phantom lines, placed so as to straddle the fixed and movable cubes 10 and 11 with its opposite ends held in abutment with the associated positioning shoulders 12 and, thereafter, a spot-welding is effected to the opposite ends of the upper thin plate 21 as shown by the phantom lines to secure the latter to the fixed and movable cubes 10 and 11. After the mounting of the upper thin plate 21, the assembly including the fixed and movable cubes 10 and 11, the jig plates 40 and the associated parts is turned 180 degrees about a longitudinal axis and, in a manner similar to the mounting of the upper thin plate 21, the rectangular lower thin plate 21 is mounted with its opposite ends spot-welded to the fixed and movable cubes 10 and 11. Thereafter, the jig plates 40 are removed, leaving the complete strain inducing element 1 as shown in FIG. 1.

With the displacement sensor S constructed as described hereinbefore, it will readily be understood that, when the machine component part to which the fixed cube 10 shown in FIG. 3 is rigidly secured undergoes vibration, tensile and compressive strains are induced respective portions of the upper and lower thin plates 21 corresponding in position to the regions of easy flexure 21a. Since the upper and lower beams 20, that is, the upper and lower thin plates 21, are disposed parallel to each other, there is no possibility that the upper and lower beams 20 are undesirably twisted and, therefore, a vibration component acting in one direction can substantially accurately be detected.

In particular, since the displacement sensor in the form of the strain inducing element 1 is of a structure wherein each of the fixed and movable cubes 10 and 11 is in the form of a metal block, a weight required for a weight element can be secured in the movable cube 11. In addition, since each of the upper and lower beams 20 is in the form of the thin plate 21 made of metal, each beam 20 can be made having a relatively small thickness and, therefore, the displacement sensor as a whole can be assembled compact in size.

Also, the formation of the regions of easy flexure 21a by the use of a non-mechanical process such as an etching process makes it possible to provide relatively thin region of easy flexure 21a and, therefore, flexure of the upper and lower thin plates 21 easily takes place even though a relatively small load is imposed on the displacement sensor. Accordingly, the movable cube 11 can be made small in size, making it possible to render the displacement sensor to be further compact in size.

Moreover, since each of the upper and lower thin plates 21 is rigidly connected to the fixed and movable cubes 10 and 11 by means of the spot-weld deposits formed by the use of the YAG laser welding technique, relatively small weld joints are sufficient to integrate the upper and lower thin plates 21 and the fixed and movable cubes 10 and 11 together to provide the complete displacement sensor and, therefore, the displacement sensor as a whole can be made compact in size.

In the foregoing embodiment of the present invention, the strain gauge 23 has been formed directly on the surface of at least one of the upper and lower thin plates 21 forming the respective upper and lower beams 20, it is possible to render those portions of such one of the upper and lower beams 20, which correspond in position to the respective regions of easy flexure 21a, to have a small thickness unlike the case in which a thin plate having a strain gauge formed thereon is bonded on the corresponding beam. Accordingly, it is possible to reduce the weight of the movable cube 11 and thence to reduce the size of the displacement sensor.

It is to be noted that formation of the plurality of the strain gauges 23 on the single, relatively large thin plate material 30 as shown in FIG. 9 is effective to increase the productivity.

Again, since in the foregoing embodiment of the present invention, the upper and lower thin plates 21 are successively welded at their opposite ends to the fixed and movable cubes 10 and 11 while the fixed and movable cubes 10 and 11 are retained in position relative to each other by using the jig plates 40 as shown in FIG. 11, there is no possibility that each of the upper and lower thin plates 21 is incorrectly fitted to either one of the fixed and movable cubes 10 and 11, facilitating an easy mounting of each thin plate 21 to the fixed and movable cubes 10 and 11.

Figure 12:
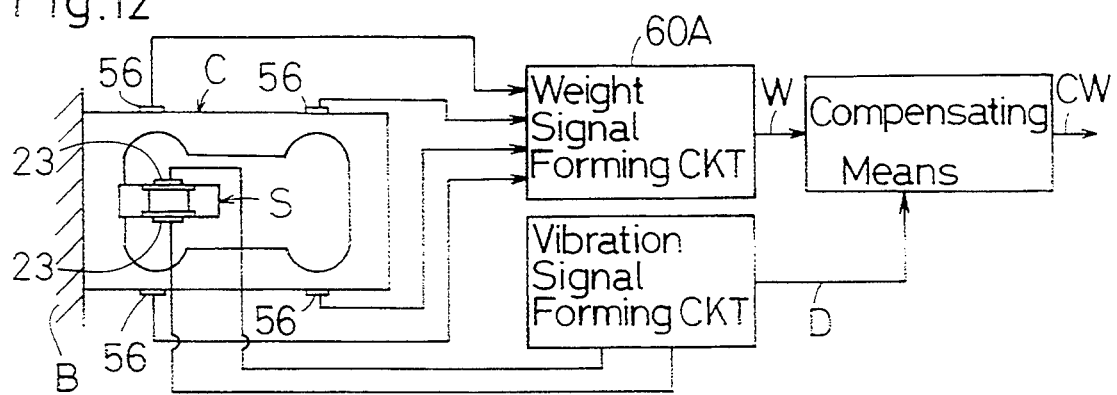
FIG. 12 is a block circuit diagram showing a signal processing circuit used in conjunction with the combined weighing and displacement sensor according to the first preferred embodiment of the present invention.

FIG. 12 illustrates a signal processing circuit. As shown therein, a weight signal W is outputted from a weight signal forming circuit 60A connected to the strain gauge 56 of the weighing cell C while a vibration signal (a displacement signal) D outputted form a vibration signal forming circuit 60B connected to the strain gauge 23 of the displacement sensor S. The weight signal W and the vibration signal D are fed to a compensating means 61 by which, after a difference in sensitivity between the weighing cell C and the displacement sensor S has been compensated for, a vibration component represented by the vibration signal D is subtracted from the weight represented by the weight signal W, to provide a corrected weight data CW in which a component of floor vibration has been eliminated.

It is to be noted that, in the foregoing embodiment of the present invention, each of the upper and lower thin plates 21 shown in FIG. 3 has been described and shown as having the grooves 24 formed therein to define the regions of easy flexure 21a in the respective upper and lower beams 20. However, in the practice of the present invention, no groove 24 may be necessarily formed in each of the upper and lower thin plates 21, an example of which is shown in FIG. 13 showing a second preferred embodiment of the present invention.

Figure 13:
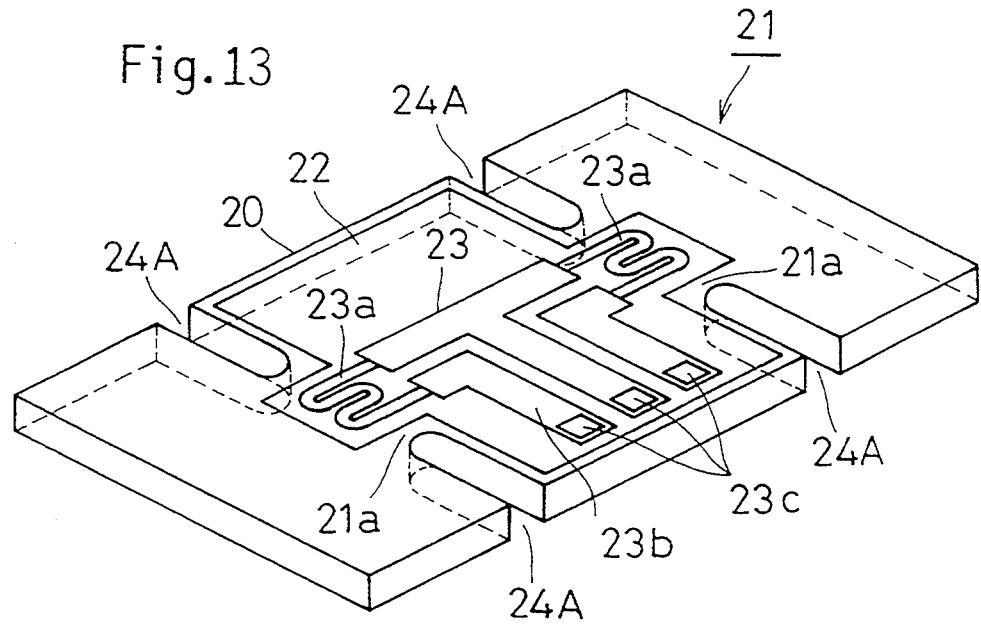
FIG. 13 is a schematic perspective view of one of thin plates forming respective beams of the strain inducing element according to a second preferred embodiment of the present invention.

Referring now to FIG. 13 which illustrates each of the upper and lower thin plates 21, the thin plate 21 shown therein has two pairs of slits 24A, the slits 24A of each pair extending inwardly from opposite sides of the thin plate 21 in a direction close towards each other so as to leave the respective region of easy flexure 21a between the slits 24A of each pair. These slits 24A may be formed by the use of any know laser beam cutting technique. Except for the use of the two pairs of the slits 24A, in place of the grooves 24 shown in FIGS. 3 and 4, to define the respective regions of easy flexure 21a in the thin plate 21, the thin plate 21 shown in FIG. 13 is substantially identical with that shown in FIGS. 3 and 4 and, therefore, the details of thereof will not be reiterated for the sake of brevity.

Figure 14:
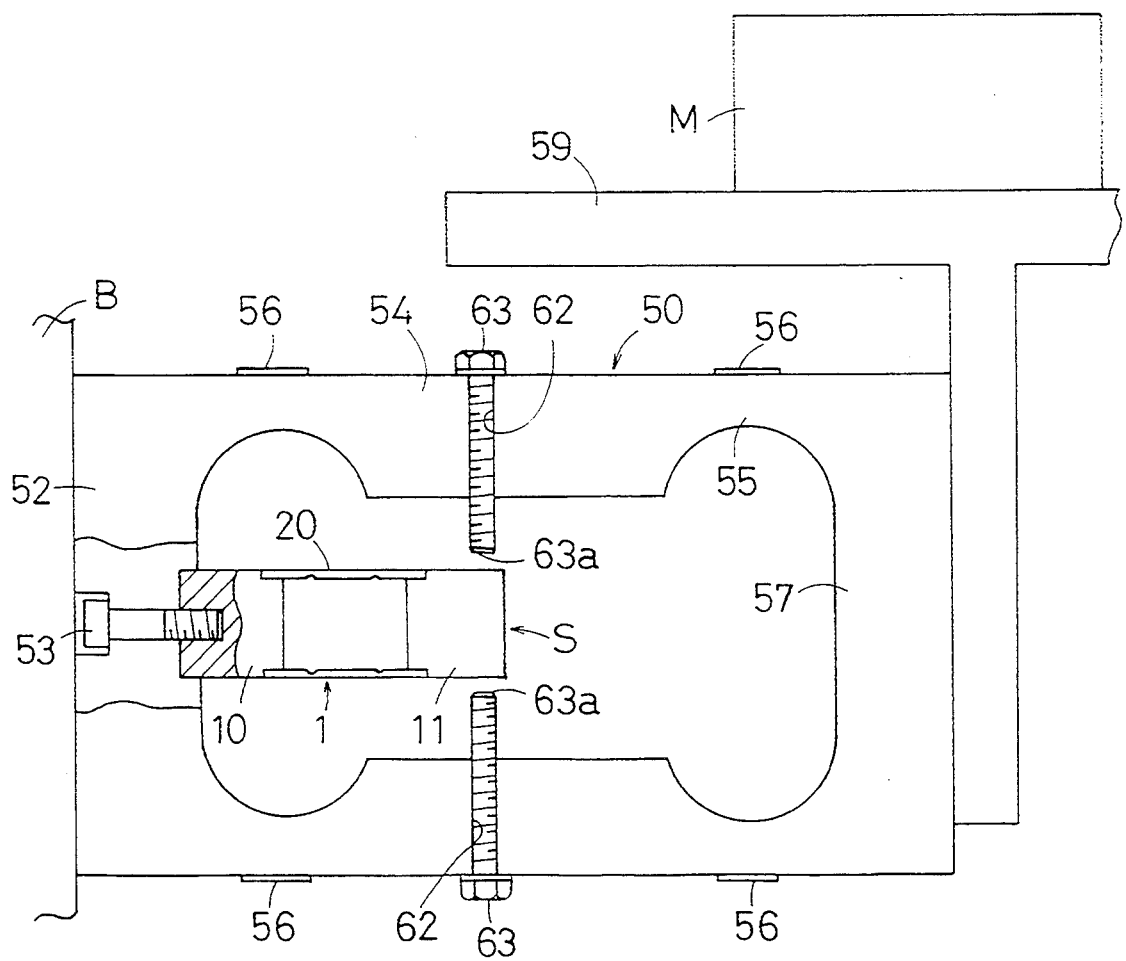
FIG. 14 is a schematic front elevational view, with a portion shown in section, of the weighing apparatus having the load cell equipped with the displacement sensor according to a third preferred embodiment of the present invention.

A third preferred embodiment of the present invention is shown in FIG. 14. In this embodiment, the upper and lower beams 54 have internally threaded through-holes 62 formed therein, respectively, so as to align with each other. Stopper bolts 63, which are examples of stopper members, are either adjustably or fixedly threaded into the respective through-holes 62 with their free end faces 63a spaced a distance from the movable rigid cube 11 of the second strain inducing element 1, that is, the displacement sensor S, so as to define the stroke of displacement of the movable rigid cube 11 of the second strain inducing element 1. Thus, the stopper bolts 63 serve as a means for regulating the stroke of displacement of the cantilevered displacement sensor S thereby to suppress an excessive displacement of the displacement sensor S which would otherwise result in damage to the displacement sensor S.

Figure 15:
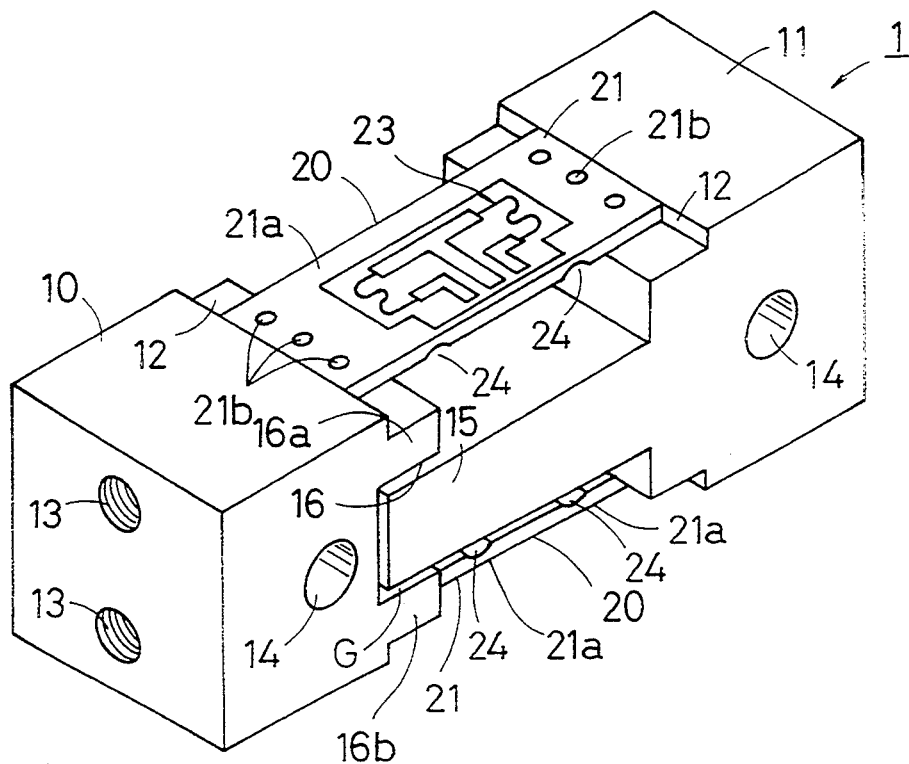
FIG. 15 is a schematic perspective view of the displacement sensor according to a fourth preferred embodiment of the present invention.

In a fourth preferred embodiment of the present invention shown in FIG. 15, the fixed rigid cube 10 of the second strain inducing element 1 is formed with a generally U-sectioned groove 16 opening towards the movable rigid cube 11 and leaving arms 16a and 16b that protrude towards the movable rigid cube 11. On the other hand, the movable rigid cube 11 is integrally formed with an elongated stopper 15 so as to extend intermediate between the upper and lower beams 20 with a free end thereof loosely received within the U-sectioned groove 16 in the fixed rigid cube 10. The U-sectioned groove 16 is so sized as to leave a slight gap G between the free end of the elongated stopper 15 and each of the arms 16a and 16b, respectively. The U-sectioned groove 16 and the elongated stopper 15 define a means for regulating the stroke of displacement of the movable rigid cube 11 relative to the fixed rigid cube 10 thereby to suppress an excessive displacement of the movable rigid cube 11 relative to the fixed rigid cube 10 which would otherwise damage the weighing cell C.

In the practice of the fourth preferred embodiment of the present invention, however, the U-sectioned groove 16 and the elongated stopper 15 may be reversed in position relative to each other although the U-sectioned groove 16 and the elongated stopper 1S have been shown and described as formed in the fixed rigid cube 10 and the movable rigid cube 11, respectively.

Figure 16:
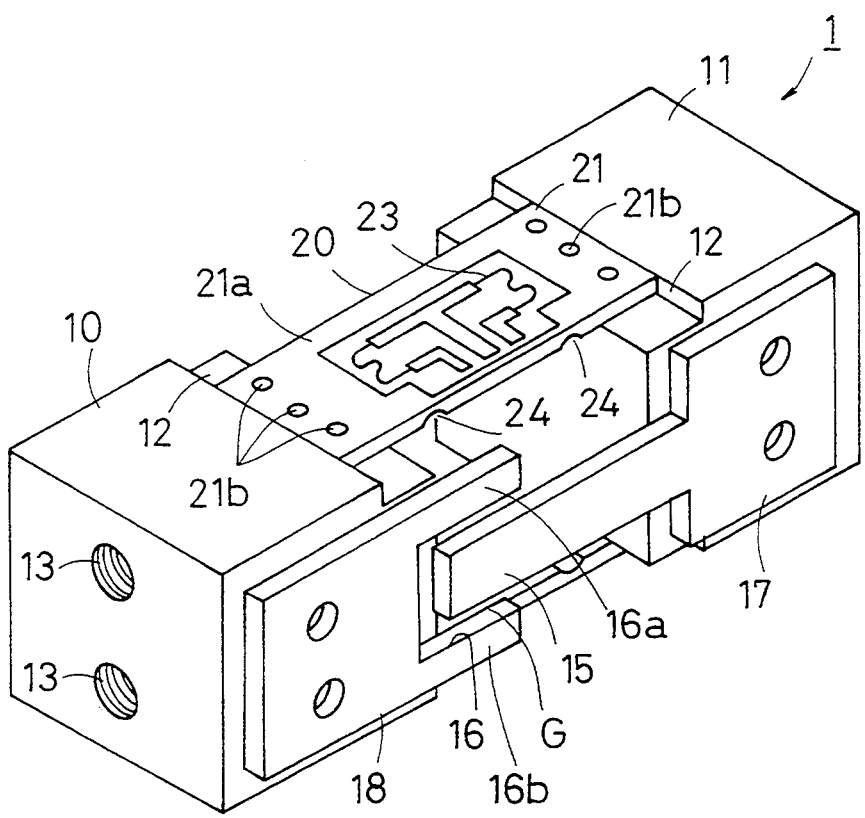
FIG. 16 is a schematic perspective view of the displacement sensor according to a fifth preferred embodiment of the present invention.

In a fifth preferred embodiment of the present invention shown in FIG. 16, the means for regulating the stroke of displacement of the movable rigid cube 11 relative to the fixed rigid cube 10 thereby to suppress an excessive displacement of the movable rigid cube 11 relative to the fixed rigid cube 10 is constituted by a generally rectangular plate 18 fixedly secured to the fixed rigid cube 10 by means of set bolts (not shown) and having a generally U-sectioned groove 16 defined therein so as to leave arms 16a and 16b protruding towards the movable rigid cube 11, and a generally T-shaped stopper plate 17 fixedly secured to the movable rigid cube 11 by means of set bolts (not shown) and having an elongated stopper 1S protruding towards the fixed rigid cube 10 with a free end thereof terminating within the U-sectioned groove 16. As is the case with the fourth embodiment of the present invention shown in Fig. 15, the U-sectioned groove 16 is so sized as to leave a slight gap G between the free end of the elongated stopper 15 and each of the arms 16a and 16b, respectively.

Similarly, in the practice of the sixth preferred embodiment of the S present invention, the rectangular plate 18 and the stopper plate 17 may be reversed in position relative to each other although the rectangular plate 18 and the stopper plate 17 have been shown and described as secured to the fixed rigid cube 10 and the movable rigid cube 11, respectively.

Figure 17:
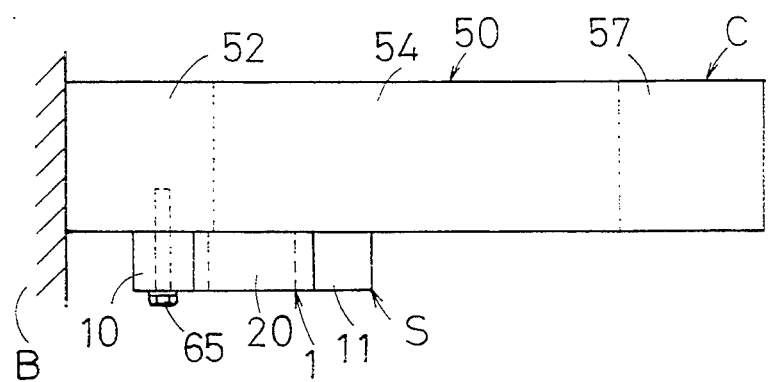
FIG. 17 is a plan view of the weighing apparatus according to a sixth preferred embodiment of the present invention.

Referring to FIG. 17 showing a sixth preferred embodiment of the present invention, while in the embodiment shown in FIGS. 11 and 12 the second strain inducing element 1, that is, the displacement sensor S, has been shown and described as supported by the fixed rigid body 52 of the first strain inducing element 50, that is, the weighing cell C, in a cantilever fashion so as to protrude into the cavity 51, the second strain inducing element 1 shown in FIG. 16 is externally carried by the fixed rigid body 52 of the first strain inducing element 50. Specifically, the second strain inducing element 1 has its fixed rigid cube 10 fixedly connected in a side-by-side fashion to a side face of the fixed rigid body 52 of the first strain inducing element 50 by means of a set bolt 65 extending through the fixed rigid cube 10 in a direction parallel to the principal plane of any one of the upper and lower beams 20 of the second strain inducing element 1, a free end of said set bolt 65 being threaded into the fixed rigid body 52 of the first strain inducing element S0.

In the practice of any one of the sixth preferred embodiments of the present invention shown in FIG. 17, since the displacement sensor S is mounted on the base B at the same position where the fixed rigid body 52 of the weighing cell C is mounted, the same phase of vibration (floor vibration) acts on the displacement sensor S and the weighing cell C and, consequently, as described with reference to the signal processing circuit shown in FIG. 12, the vibration component contained in the weight signal W can be accurately detected and removed on the basis of the displacement signal D outputted from the displacement sensor S, making it possible to accomplish a precise and accurate weight measurement.

In addition, since the displacement sensor S utilizing the beams 20 in the form of the thin plates 21 is compact in size, even securement of the displacement sensor S to the fixed rigid body 52 of the weighing cell C does not results in generation of a relatively large amount of strains in the fixed rigid body 52 of the weighing cell C and, accordingly, the strain characteristic of the load on the weighing cell C will not be adversely affected.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although in any one of the foregoing embodiments of the present invention each of the upper and lower thin plates 21 has been described as formed with the grooves 24 (FIG. 4) or the slits 24A (FIG. 12) to define the respective regions of easy flexure 21a, neither the grooves 24 nor the slits 24A are essential. Since the upper and lower thin plates 21 are, even though neither the groove nor the slit is formed, apt to flexure at respective portions adjacent the fixed and movable rigid bodies 10 and 11, those portions of the upper and lower thin plates 21 may be defined as the respective regions of easy flexure 21a.

Also, each of the upper and lower beams 20 may not be constituted by the thin plate 21 and, instead thereof, the upper and lower beams may be formed integrally with the fixed and movable rigid bodies 10 and 11.

Moreover, although the strain gauge 23 has been described in the form of a strain gauge including metal thin films, a semiconductor thin-film strain gauge such as made up of films of hydrogenated amorphous silicon.

Accordingly, such changes and modifications are, unless they depart from the scope of the present invention as delivered from the claims annexed hereto, to be construed as included therein.

What is claimed is:

1. A combination of a weighing cell with a displacement sensor, said combination comprising:

said weighing cell including;
    a strain inducing element having a strain generating region at which strain is generated in response to application of a load thereto; and
    a strain gauge for detecting the strain generated in the strain generating region;
    said strain inducing element including a fixed rigid body adapted to be secured to a base and a movable rigid body adapted to receive the load to be measured, and first and second beams rigidly secured at opposite ends to the fixed and movable rigid bodies and extending parallel to each other between the fixed and movable rigid bodies; and said displacement sensor including;
    fixed and movable rigid components, said movable rigid component forming a weight element;
    a generally elongated beam member rigidly secured at opposite ends to the fixed and movable rigid components so as to extend between the fixed and movable rigid components, and
    a displacement detecting element mounted on said elongated beam member for outputting an electric signal of a magnitude proportional to the amount of displacement of the movable rigid component in a direction generally perpendicular to the elongated beam member; wherein
    said fixed rigid component of said displacement sensor is fixedly attached to the fixed rigid body of the weighing cell, and
    said displacement sensor is discrete from said weighing cell.

2. The combination of the weighing cell with the displacement sensor as claimed in claim 1, wherein said strain inducing element has a cavity defined therein and delimited by the fixed and movable rigid bodies and the first and second beams and wherein said displacement sensor is accommodated within said cavity.

3. The combination of the weighing cell with the displacement sensor as claimed in claim 1, wherein said displacement sensor is carried by the weighing cell with the fixed rigid component thereof secured to a side face of the fixed rigid body of the weighing cell.

4. The combination of the weighing cell with the displacement sensor as claimed in claim 1, further comprising a stopper means mounted on the strain inducing element of the weighing cell for suppressing an excessive displacement of the movable rigid component of the displacement sensor relative to the fixed rigid component thereof thereby to avoid a possible excessive deformation.

5. The combination of the weighing cell with the displacement sensor as claimed in claim 1, wherein each of said fixed and movable rigid components is in the form of a block and wherein said elongated beam member comprises first and second beam elements extending parallel to each other between the fixed and movable rigid components, each of said first and second beam elements having at least one region of easy flexure defined therein forming said strain generating region and being in the form of a thin plate made of metal, said displacement detecting element being mounted on at least one of said first and second beam elements in alignment with the corresponding region of easy flexure.

6. The combination of the weighing cell with the displacement sensor as claimed in claim 5, wherein the opposite ends of each of said first and second beam elements of the displacement sensor are welded to the fixed and movable rigid components.

7. The combination of the weighing cell with the displacement sensor as claimed in claim 1, further comprising means for regulating a stroke of displacement of the movable rigid component relative to the fixed rigid component thereby to suppress an excessive displacement of the movable rigid component relative to the fixed rigid component, said regulating means comprising a generally elongated stopper element rigidly secured to one of the fixed and movable rigid component so as to extend in a direction towards the other of the fixed and movable rigid components and positioned generally intermediate between the first and second beams, and a groove means provided in the other of the fixed and movable rigid components for defining a groove for receiving the stopper element.

8. A weighing apparatus which comprises a combination of a weighing cell with a displacement sensor:

said weighing cell including a strain inducing element having a strain generating region at which strain is generated in response to application of a load thereto; and a strain gauge for detecting the strain generated in the strain generating region, said strain inducing element including a fixed rigid body adapted to be secured to a base and a movable rigid body adapted to receive the load to be measured, and first and second beams rigidly secured at opposite ends to the fixed and movable rigid bodies and extending parallel to each other between the fixed and movable rigid bodies; and said displacement sensor including fixed and movable rigid components, said movable rigid component forming a weight element, a generally elongated beam member rigidly secured at opposite ends to the fixed and movable rigid components so as to extend between the fixed and movable rigid components, and a displacement detecting element mounted on said elongated beam member for outputting an electric signal of a magnitude proportional to the amount of displacement of the movable rigid component in a direction generally perpendicular to the elongated beam member, said fixed rigid component of said displacement sensor being fixedly attached to the fixed rigid body of the weighing cell, and said displacement sensor being discrete from said weighing cell; and a weighing table coupled with the movable rigid body of said weighing cell for placement thereon of an article of which weight is to be measured.

9. The weighing apparatus as claimed in claim 8, wherein said strain inducing element has a cavity defined therein and delimited by the fixed and movable rigid bodies and the first and second beams and wherein said displacement sensor is accommodated within said cavity.

10. The weighing apparatus as claimed in claim 8, wherein said displacement sensor is carried by the weighing cell with the fixed rigid component thereof secured to a side face of the fixed rigid body of the weighing cell.

11. A combination of a weighing cell with a displacement sensor, said combination comprising:
  said weighing cell including;
    a strain inducing element having a strain generating region at which strain is generated in response to application of a load thereto; and
    a strain gauge for detecting the strain generated in the strain generating region;
    said strain inducing element including a fixed rigid body adapted to be secured to a base and a movable rigid body adapted to receive the load to be measured, and first and second beams rigidly secured at opposite ends to the fixed and movable rigid bodies and extending parallel to each other between the fixed and movable rigid bodies; and
  said displacement sensor including;
    fixed and movable rigid components, said movable rigid component forming a weight element;
    a generally elongated beam member rigidly secured at opposite ends to the fixed and movable rigid components so as to extend between the fixed and movable rigid components, and
    a displacement detecting element mounted on said elongated beam member for outputting an electric signal of a magnitude proportional to the amount of displacement of the movable rigid component in a direction generally perpendicular to the elongated beam member; wherein said strain inducing element has a cavity defined therein and delimited by the fixed and movable rigid bodies and the first and second beams and wherein said displacement sensor is accommodated within said cavity with the fixed rigid component of said displacement sensor being fixedly secured to the fixed rigid body of the weighing cell.

12. A weighing apparatus which comprises a combination of a weighing cell with a displacement sensor:
  said weighing cell including a strain inducing element having a strain generating region at which strain is generated in response to application of a load thereto; and a strain gauge for detecting the strain generated in the strain generating region, said strain inducing element including a fixed rigid body adapted to be secured to a base and a movable rigid body adapted to receive the load to be measured, and first and second beams rigidly secured at opposite ends to the fixed and movable rigid bodies and extending parallel to each other between the fixed and movable rigid bodies; and
  said displacement sensor including fixed and movable rigid components, said movable rigid component forming a weight element, a generally elongated beam member rigidly secured at opposite ends to the fixed and movable rigid components so as to extend between the fixed and movable rigid components, and a displacement detecting element mounted on said elongated beam member for outputting an electric signal of a magnitude proportional to the amount of displacement of the movable rigid component in a direction generally perpendicular to the elongated beam member; and
  a weighing table coupled with the movable rigid body of said weighing cell for placement thereon of an article of which weight is to be measured, wherein
    said strain inducing element has a cavity defined therein and delimited by the fixed and movable rigid bodies and the first and second beams, and
    said displacement sensor is accommodated within said cavity with the fixed rigid component of said displacement sensor being fixedly secured to the fixed rigid body of the weighing cell.

* * * * *